United States Patent Office 3,173,838
Patented Mar. 16, 1965

3,173,838
SOLID, VITAMIN E-ACTIVE PRODUCT AND PROCESS FOR MAKING IT
Gary Brooks, Rochester, N.Y., assignor to Eastman Kodak Company, Rochester, N.Y., a corporation of New Jersey
No Drawing. Filed Mar. 28, 1962, Ser. No. 183,038
3 Claims. (Cl. 167—81)

This invention relates to vitamins. More particularly, it relates to a solid, vitamin E-active product and to a process for making this product.

In the U.S. Patent No. 2,940,900, to Benton and Anderson, there is described a process for making a solid, cold water dispersible vitamin E-active product. This product basically comprises a solid carrier consisting essentially of acacia and dispersed within the carrier minute droplets of a vitamin E-active oil. The process basically comprises (1) dissolving acacia (a common name for gum arabic, also sometimes called gum acacia) in water to form an aqueous solution of acacia, (2) dispersing a vitamin E-active oil in the solution to form an emulsion of the oil-in-water type and (3) evaporating the water from the emulsion, whereby a solid product is obtained. The solid product is comminuted into finely divided particles.

One problem to which this invention is addressed relates ot the cold water dispersibility of the finely divided, solid, vitamin E-active product of the Benton et al. process. One feature of this product is that it is readily dispersible in cold water. This means that the carrier acacia readily dissolves in cold water, leaving the droplets of vitamin E-active oil suspended in the cold water. Hence, this product is useful in making aqueous, vitamin E-active preparations for addition to animal and poultry drinking water and for addition as by spray application to dry, animal and poultry feeds and the like. However, while the rate of dispersion of the product in cold water is acceptable, improvement in the rate of dispersion is desirable. The problem, therefore, is to obtain a substantial increase in the rate of cold water dispersibility of the Benton et al. product.

A general object of this invention is to provide a solution to this problem.

This object is achieved by this invention which is based on the discovery that the addition of a surface active agent to the aqueous phase of the emulsion in the Benton et al. process results in a more rapidly cold water dispersible, solid, vitamin E-active product.

Another problem to which this invention in its more specific embodiments is directed arises in the rinse step of the Benton et al. process. Inevitably in the comminution step of this process a small but nevertheless significant quantity of the vitamin E-active oil becomes exposed at the exterior surfaces of the finely divided particles. The presence of this oil at the exterior surfaces of the particles adversely affects their free flowing properties as well as their tableting properties. Hence, to prepare the particles for tableting and for various end uses, the particles are rinsed or washed with a solvent (such as hexane) for the vitamin E-active oil. However, during this rinse step as much as 50 percent by weight of the vitamin E-active oil content of the solid particles is extracted or leached therefrom. Not only is vitamin E-active oil on the surfaces of the particles removed but also in this stage vitamin E-active oil is extracted from inside the particles. The proportion extracted is usually a function of the initial vitamin E-active oil content of the solid product prior to comminution; that is, the higher the concentration of vitamin E-active oil initially present in the solid product prior to comminution, the higher the percent of vitamin E-active oil extracted from the particles in this step. One consequence of this extraction effect is that high potency (500 International Units per gram and higher) vitamin E products are practically impossible to obtain on a consistent basis by the Benton et al. process when the rinse step is employed. Another consequence is a substantial loss in efficiency of the Benton et al. process when the rinse step is employed. Hence, the problem here is to minimize the extraction of vitamin E-active oil in this rinse step.

An object of this invention in its more specific embodiments is to provide a solution to this problem.

This object and others are achieved by this invention in its more specific embodiments which are based on the further discovery that generally the more solvent soluble the surface active agent contained by the solid, vitamin E active product the more selective is the solvent action of the solvent relative to the product. Investigations have shown that the higher the solubility of the surface active agent in the solvent, the greater is the quantity of surface active agent leached from the product by the solvent in the rinse step and the lesser is the quantity of vitamin E-active oil extracted from the product by the solvent in the rinse step.

This invention, in summary, provides an improved process for making a solid vitamin E-active product wherein acacia is employed as the carrier for a vitamin E-active composition. In general, this improved process comprises: (1) preparing a dispersion of a water insoluble, vitamin E-active composition in a solution of acacia, water and a surface active agent, and (2) converting the dispersion into a substantially dry product. There is thereby obtained an improved, solid, vitamin E-active product which, particularly when comminuted, is characterized by an improved rate of cold water dispersibility. Moreover, when the surface active agent is highly soluble in the rinse solvent, there is thereby obtained an improved, solid, vitamin E-active product which is also characterized when comminuted and then subjected to rinsing with the solvent for the vitamin E-active composition by a substantially greater retention of its vitamin E potency.

Hence, this invention also includes a composition of matter aspect. In brief, this invention provides a solid, vitamin E-active product comprising a vitamin E-active composition finely dispersed in a solid carrier consisting essentially of gum acacia and a surface active agent. This product in specific embodiments thereof is finely divided and free flowing. In addition in specific embodiments of the product the surface active agent is highly soluble in the rinse solvent.

In the process aspect of this invention the dispersion can be prepared by two procedures. In one procedure an aqueous solution consisting essentially of acacia, water and surface active agent is first formed and then the water-insoluble, vitamin E-active composition is dispersed in the aqueous solution. In the second procedure there is first formed a dispersion of the water-insoluble, vitamin E-active composition in an aqueous solution consisting essentially of acacia and water and then the surface active agent is gently admixed into the solution. The second procedure is preferred to the first procedure, however, because the surface active agent in the aqueous solution prior to dispersing in the solution the water-insoluble, vitamin E-active composition, while not appearing to affect adversely the improved, cold water dispersibility of the end product, can interfere with the dispersion stabilization properties of the acacia and thereby result in an undesirably high extraction of vitamin E-active composition in the solvent rinse step. Hence, in the preferred embodiment of the process of this invention the second procedure is employed.

In the preferred embodiment of the process of this invention the dispersion that is first formed, the initial dispersion, comprises as the discontinuous phase a water-insoluble vitamin E-active composition and as the continuous phase an aqueous solution consisting essentially of water and acacia.

The water-insoluble, vitamin E-active composition is generally obtained as an oleoginous concentrate, wherefore the initial dispersion is generally an emulsion. The concentrate usually comprises a vitamin E-active compound at a concentration from about 5 to about 100% by weight of the concentrate. The composition may also comprise an edible vegetable oil at a concentration in a range from 0 to about 60% by weight of the concentrate. Vitamin E-active compounds (as well as vitamin E-active concentrates) are well known, commercially available, products. In general, the vitamin E-active compound is a tocopherol (generally an α-tocopherol such as d-α-tocopherol and dl-α-tocopherol), or a tocopheryl ester (generally α-tocopherol acetate such as d-α-tocopheryl acetate and dl-α-tocopheryl acetate, or an α-tocopheryl acid succinate such as d-α-tocopheryl acid succinate and dl-α-tocopheryl acid succinate). If desired, though not usually necessary, the oleoginous concentrate can also comprise one or more antioxidants such as, for example, butylated hydroxyanisole, butylated hydroxytoluene, propyl gallate and the like.

Concentration of the water-insoluble, vitamin E-active composition in the initial dispersion depends on the vitamin E potency desired in the end product. In general, however, the concentration of the water-insoluble vitamin E-active composition in the initial dispersion is in a range from about 5 to about 60% by weight of the initial dispersion.

Concentration of the acacia in the initial dispersion is dependent on the vitamin E potency desired in the end product and also on the consistency of the aqueous solution necessary to establish and maintain the water-insoluble vitamin E-active composition in a substantially stably dispersed condition from the time of formation of the initial dispersion until the ultimate dispersion is converted into a substantially dry product. In general, concentration of the acacia in the initial dispersion is in a range from about 10 to about 60% by weight of the initial dispersion.

Water concentration of the initial dispersion and thus of the aqueous solution phase of the initial dispersion is important for a number of reasons.

In the first place water concentration has a direct relationship to consistency of the aqueous solution. It is necessary that the aqueous solution have a consistency such that substantial agglomeration and coalescence of the dispersed, water insoluble vitamin E-active composition does not occur from the time the initial dispersion is formed until the ultimate dispersion is converted into a substantially dry product. At the same time the consistency should not be so great as to require impractical time and equipment conditions to achieve the proper degree and uniformity of dispersion or emulsion. The consistency of the initial dispersion in general is such that generally the Brookfield viscometer viscosity of the dispersion at 20° C. is in a range from about 500 to about 20,000 centipoises and preferably from about 500 to about 10,000 centipoises.

Water concentration of the initial dispersion and thus of the aqueous solution portion thereof is selected, therefore, with these factors in mind. In general, satisfactory results are obtained when the water concentration is in a range from about 30 to about 60% by weight of the initial dispersion with particularly satisfactory results being obtained when the water concentration is in a preferred range from about 33 to about 48% by weight of the initial dispersion.

The aqueous solution at this stage of the preferred embodiment of the process of this invention consists essentially of acacia and water. In specific embodiments of this invention, however, it can also comprise an edible, water soluble, sugar such as, for example, sucrose, glucose, lactose, sorbitol, other carbohydrates and the like. A purpose of a sugar in the Benton et al. product is to improve the water dispersibility of the product. In view of the improved water dispersibility obtained under the concepts of this invention, a sugar is generally not necessary. However, if a sugar is employed, a sugar concentration of about 25% by weight of the initial dispersion is about the maximum. Sugar in excess of this concentration tends to make the end product hydroscopic and become sticky and gummy, thereby adversely affecting the free flowing properties of the end product. Moreover, when sugar is present in excess of this concentration, evaporation of water from the ultimate dispersion becomes difficult to perform.

The initial dispersion is preferably made by first preparing the aqueous solution consisting essentially of water and acacia and then dispersing in the aqueous solution the water-insoluble, vitamin E-active composition. The aqueous solution consisting essentially of acacia and water is prepared by merely admixing with water acacia in finely divided form.

Dispersing of the water insoluble, vitamin E-active composition in the aqueous solution is preferably accomplished by vigorously admixing the composition and the solution until a uniform dispersion is obtained and the particle size of the vitamin E-active composition is 15 microns or less and preferably 8 microns or less. Vigorous admixing can be accomplished by conventional homogenization procedures and equipment as by means of an impeller type agitator such as, for example, a Cowles dissolver.

After the initial dispersion has been formed in accordance with the preferred embodiment of the process of this invention the surface active agent is then added to it to form the ultimate dispersion. The surface active agent comprises one or more surface active, edible compounds which preferably are compatible with the calcium content of the acacia and stable under the process conditions involved at this stage and in converting the ultimate dispersion into a substantially dry solid product. Any type of surface active compound in including anionic, cationic and nonionic surface active compounds can be used. Preferred surface active compounds are solvent soluble surface active agents such as nonpolar solvent soluble phosphatides and particularly lecithins such as, for example, naturally occuring lecithin, a hydroxylated lecithin (which can be produced in accordance with any one of the pertinent examples of the U.S. Patent, No. 2,629,662, to Julian et al.) and the like.

Concentration of the surface active agent in the the ultimate dispersion is generally in a range from about 1 to about 10% by weight of the acacia and preferably in a range from about 1 to about 5% by weight of the acacia. Higher concentrations of surface active agent can be employed but at a concentration in excess of about 10% by weight of the acacia destabilization of the dispersion is generally experienced. At concentrations less than about 1% by weight of the acacia, the desired results are generally not obtained.

The surface active agent is added to the initial dispersion with gentle mixing action. If the mixing action is too great, in some instances, because of the presence of the surface active agent, there can result coalescence of the dispersed, water-insoluble, vitamin E-active composition.

The ultimate dispersion thereby formed can now be converted into a dry, solid product. Before doing so, however, mold inhibitors, color imparting materials and the like, when desired, can be incorporated into the ultimate dispersion. Again, only gentle mixing action is employed.

Conversion of the ultimate dispersion into a dry, solid product is performed preferably by the procedure disclosed in the Benton et al. patent. In this procedure, the ultimate dispersion is poured as a thin layer on an evaporating surface such as provided by a drum dryer and substantially all of the water is evaporated from the thin layer under time and temperature conditions correlated to produce a dry, porous frangible sheet. The sheet is then removed from the evaporating surface and preferably thereafter comminuted into finely divided particles.

In the more specific phases of the preferred embodiment of the process of this invention, the finely divided particles are "leached" or rinsed with a solvent for the water-insoluble, vitamin E-active composition. A preferred solvent is hexane. Other nonpolar, organic solvents can be used, however. In this regard, the solvent should be inert to acacia, be a nonsolvent for acacia and be readily removed by evaporation from the dry particles. Nonpolar solvents generally meet these requirements. Upon completion of the rinse step, warm air is passed through the dry solid particles until residual rinse solvent is removed by evaporation.

Thus, there is obtained a dry, finely divided, free-flowing, vitamin E-active, solid product which has an improved rate of water dispersibility. When the surface active agent employed in the process is highly soluble in the rinse solvent, the proportion of water-insoluble vitamin E-active compositions removed in the solvent rinse step is substantially reduced. Surprisingly, when a lecithin is employed and the Benton et al. conversion procedure used, increased drying rates of the sheet have been obtained, hopper flow during comminution is improved, thereby eliminating product holdup, and sharper particle size distributions have been produced.

This invention is further illustrated by the following examples of various aspects thereof including specific embodiments. Unless otherwise indicated, this invention is not limited to these specific embodiments. In the examples parts and percentages are by weight.

EXAMPLE 1

This example illustrates the preparation of one specific embodiment of the dry, finely divided, vitamin E-active product of this invention. This embodiment of the general product is characterized not only by an improved rate of dispersion but a vitamin E potency after solvent washing in excess of 500 I.U. per gram.

Thoroughly dissolve 296 parts of acacia in 400 parts of cold water. Add to the solution 244 parts of a d-α-tocopheryl acetate concentrate, the vitamin E potency of which is 1360 International Units per gram. Homogenize the resulting mixture for 5 minutes by means of an impeller type agitator such as a Cowles dissolver, whereby an emulsion is formed.

Dissolve 15 parts of bleached, fluid, soybean lecithin in 15 parts of ethanol, forming thereby a premix. Add this premix with agitation to 45 parts of water, forming thereby a dispersion.

Add the water-ethanol-lecithin dispersion to the emulsion with mild agitation to obtain uniform distribution of the lecithin throughout the emulsion. A modified emulsion is formed thereby.

Pour the modified emulsion onto the evaporation surface of a double drum dryer heated to about 285° F. with 40 p.s.i. steam. Set the drum gap at 0.25 inch with the drum speed in a range from 1 to 4 r.p.m. and preferably at 3 r.p.m. A dry, porous, frangible sheet is the result. Comminute the dried sheet to a powder with a rotary cutter.

Take a sample of the powder, screen out a −30 +120 mesh, U.S. screen size, fraction. Assay this fraction for vitamin E potency.

Wash the powder with hexane using a total of 3.3 parts of hexane per part of powder. Evaporate residual hexane from the washed powder and then screen the powder to obtain a −30 +120 mesh, U.S. screen size, fraction. This fraction is the end product.

Test the end product for rate of dispersion by admixing with a spatula a one gram sample of the product and 100 milliliters of water at 20° C. and noting how long it takes for the acacia portion of the powder with mild agitation to go completely into solution.

Also, assay a sample of the end product for vitamin E potency.

For purposes of comparison prepare a vitamin E-active product by the foregoing procedure but omit the step of adding the water-ethanol-lecithin dispersion to the emulsion. This product can be regarded as a prior art product.

Typical results obtained in following the foregoing procedures in preparing the product of this invention and in preparing the prior art product are summarized in the following Table I.

Table I

| | Prior Art Product | | Product of Invention | |
|---|---|---|---|---|
| | Before Hexane Wash | After Hexane Wash | Before Hexane Wash | After Hexane Wash |
| Vitamin E potency (I.U. per gram) | 598 | 525 | 598 | 570 |
| Composition, percent: | | | | |
| d-α-Tocopheryl acetate concentrate | 44.0 | 38.6 | 44.0 | 41.9 |
| Acacia | 56.0 | 61.4 | 53.3 | 57.2 |
| Lecithin | | | 2.7 | 0.9 |
| Loss of d-α-tocopheryl acetate in hexane wash | 20 percent | | 8.2 percent | |
| Loss of lecithin in hexane wash | | | 70 percent | |
| Dispersion Time | 6 minutes | | 2 minutes | |

From these typical data it is apparent that the product of this invention not only has a decreased dispersion time but also a substantial reduction in loss of the vitamin E-active composition from the product in the solvent rinse step. These typical data indicate that the decreased dispersion time of the hexane washed product is probably due to the increased porosity of the particles of the product resulting from the leaching of lecithin therefrom.

This product of this invention is useful in tableting operations.

EXAMPLE 2

This example illustrates the preparation of still another specific embodiment of the general product of this invention.

Thoroughly dissolve 335 parts of acacia in 500 parts of water. Add to the solution 165 parts of d-α-tocopheryl acetate concentrate having a vitamin E potency of 1360 International Units per gram of concentrate. Homogenize the mixture for 5 minutes by means of an impeller type agitator such as a Cowles dissolver, whereby an emulsion is formed.

Admix into the emulsion with gentle agitation to obtain uniform distribution 18.5 parts of a hydroxylated lecithin such as that made according to the U.S. Patent No. 2,629,662, to Julian et al. A commercially available hydroxylated lecithin is available as Centrolene S from the Central Soya Co., Inc. Thereby, a modified emulsion is formed.

Pour the modified emulsion onto the evaporation surface of a double drum dryer heated to about 285° F. with 40 p.s.i. steam with the drum gap being set at 0.25 inch and with the drum speed in a range from 1 to 4 r.p.m. and preferably maintained at 3 r.p.m. A dry, porous, frangible sheet is thereby obtained. Comminute the dry sheet to a powder with a rotary cutter. Wash the powder with hexane, using a total of 5 milliliters of hexane per gram of powder. Subject the washed powder to air evaporation and then screen the washed powder to obtain a −30 +120, U.S. screen size, fraction as a dry, finely divided, free flowing, vitamin E active, solid product of this invention.

Test the product for rate of dispersion by adding with a spatula 1 gram of the product to 100 milliliters of water at 20° C. and noting the length of time it takes for the acacia portion of the powder with mild agitation to go completely into solution. Also, assay a sample of the product for vitamin E potency.

For purposes of comparison, prepare a vitamin E-active product under the same conditions and procedure, but omit the step of admixing a hydroxylated lecithin to the emulsion. The resulting product can be regarded as a prior art product.

Typical results obtained in following these procedures of this Example 2 in preparing the product of this invention and in preparing the prior art product are collated in the following Table II.

corresponding numerical percentages set out in Table III. The quantity of water employed in each example is in parts approximately 1½ times the parts of acacia employed in that example.

For purposes of comparison prepare a vitamin E-active product following the same procedure as in Examples 3–5 omitting the step of admixing a surface active agent or surfactant to the emulsion but employing 34.7 parts of the d-α-tocopheryl acetate concentrate having a vitamin E potency of 634 I.U. per gram, 65.3 parts of acacia and 98 parts of water. The product thus obtained can be regarded as a prior art product.

Typical results obtained in preparing according to the process of this invention the products of Examples 3–5 and in preparing according to the prior art said prior art product are summarized in Table III.

*Table III*

|  | Prior Art Product | | Example 3 Product of Invention | | Example 4 Product of Invention | | Example 5 Product of Invention | |
| --- | --- | --- | --- | --- | --- | --- | --- | --- |
|  | Before Hexane Wash | After Hexane Wash | Before Hexane Wash | After Hexane Wash | Before Hexane Wash | After Hexane Wash | Before Hexane Wash | After Hexane Wash |
| Vitamin E potency (I.U. per gram) | 220 | 192 | 190 | 162 | 207 | 84 | 220 | 61 |
| Components, percent: | | | | | | | | |
| d-α-tocopheryl acetate concentrate | 34.7 | 30.2 | 30.0 | 25.6 | 32.2 | 13.2 | 34.7 | 9.6 |
| Acacia | 65.3 | 69.8 | 68.0 | 72.3 | 65.4 | 84.2 | 61.8 | 85.7 |
| Sodium lauryl sulfate | | | 2.0 | 2.1 | | | | |
| Polyoxyethylene (20) sorbitan monolaurate [1] | | | | | 2.4 | 2.6 | | |
| Alkyl trimethylammonium chloride [2] | | | | | | | 3.5 | 4.7 |
| Loss of d-α-tocopheryl acetate concentrate in hexane wash | 18.5% | | 19.7% | | 68% | | 80% | |
| Loss of surfactant in hexane wash | | | 0% | | 17% | | 4.1% | |
| Dispersion Time | 6¼ minutes | | 3½ minutes | | 3¼ minutes | | 1½ minutes | |

[1] An ethylene oxide adduct of sorbitan monolaurate wherein the ethylene oxide content of the molecule averages about 20 mole percent. This nonionic surfactant is available as Tween 20 from the Atlas Chemical Industries, Inc.
[2] The particular cationic surfactant used was a mixture of compounds corresponding to the formula R—N(CH$_3$)$_3^+$Cl$^-$ and derived from the fatty acids of tallow. It is available as Arquad T from Armour Industrial Chemical Company, Division of Armour & Co. The concentrations set forth are on an active agent basis.

*Table II*

|  | Prior Art Product | | Product of Invention | |
| --- | --- | --- | --- | --- |
|  | Before Hexane Wash | After Hexane Wash | Before Hexane Wash | After Hexane Wash |
| Vitamin E potency (I.U. per gram) | 450 | 396 | 450 | 417 |
| Components, percent: | | | | |
| d-α-Tocopheryl acetate concentrate | 33.0 | 29.2 | 33.0 | 30.6 |
| Acacia | 67.0 | 70.8 | 63.5 | 67.8 |
| Hydroxylated lecithin | | | 3.5 | 1.6 |
| Loss of d-α-Tocopheryl acetate concentrate in hexane wash | 16.5 percent | | 10.3 percent | |
| Loss of hydroxylated lecithin in hexane wash | | | 57 percent | |
| Dispersion Time | 5 minutes | | 1 minute | |

Thus, not only is the specific product of this invention improved in dispersion time but also in retention of vitamin E potency when washed with a solvent. Accordingly, this particular product of this invention is especially useful for tableting.

EXAMPLES 3–5

These examples illustrate the preparation of still other specific embodiments of the general product of this invention. These specific embodiments are primarily characterized by improved dispersion times.

For each example follow the procedure of Example 2 but with the components indicated in the following Table III. For these examples use a d-α-tocopheryl acetate concentrate having a vitamin E potency of 634 I.U. per gram. The quantities of components in parts equal the From these data of Table III it is evident that surface active agents, when incorporated into dry, finely divided, free flowing, vitamin E-active products involving acacia as a carrier, increase their cold water dispersion rates. This holds true regardless of whether the surface active agent is nonionic, anionic or cationic, as long as the surface active agent is compatible with the acacia. One disadvantage of the surface active agents in Examples 3–5 is the large loss of vitamin E-potency in washing the respective, finely divided products with hexane. These products, accordingly, are not recommended for tableting operations. However, for animal and poultry feed use which does not require solvent washing of the solid, vitamin E-active product, the products of Examples 3–5 are quite suitable.

Thus, there is provided an improved, dry, solid, vitamin E-active product and an improved process for making the product.

Other features, advantages and embodiments of this invention will be apparent to those in the exercise of ordinary skill after reading the foregoing disclosure. In this regard, although the invention has been described in considerable detail with reference to certain specific embodiments thereof, variations and modifications of these embodiments can be effected within the spirit and scope of the invention as described and as claimed.

The embodiments of this invention in which an exclusive property or privilege is claimed are defined as follows:

1. In a process for making a cold water dispersible, dry, finely divided, solid, vitamin E-active product, which comprises the steps of preparing a dispersion of an α-tocopheryl acetate concentrate in a solution of acacia and water, the concentration of said concentrate in said dispersion being in a range from about 5 to about 60% by weight of said dispersion, the concentration of said acacia being in a range from about 10 to about 60% by weight of said dispersion and the concentration of water being in a range from about 30 to about 60% by weight of said dispersion; spreading said dispersion out on an evaporative surface and evaporating water therefrom to dryness, whereby a dry, porous, frangible sheet is formed; comminuting said sheet, whereby a dry, finely divided, solid product is formed; and rinsing said product with hexane; the improvement which comprises the step of admixing into said dispersion with gentle agitation a quantity of a hydroxylated lecithin in a range from about 1 to about 5% by weight of said acacia.

2. In a process for making a cold water dispersible, dry, finely divided, solid, vitamin E-active product, which comprises the steps of preparing a dispersion of a water insoluble vitamin E-active oil in a solution of acacia and water, the concentration of said vitamin E-active oil in said dispersion being in a range from about 5 to about 60% by weight of said dispersion, the concentration of said dispersion being in a range from about 5 to about by weight of said dispersion and the concentration of water being in a range from about 30 to about 60% by weight of said dispersion; converting said dispersion into a dry, finely divided, solid product; and rinsing said product with hexane; the improvement which comprises the step of admixing into said dispersion with gentle agitation a quantity of a hexane-soluble lecithin in a range from about 1 to about 10% by weight of said acacia.

3. In a process for making a cold water dispersible, dry, finely divided, solid, vitamin E-active product, which comprises the steps of preparing a dispersion of a water insoluble, vitamin E-active oil in a solution of acacia and water, the concentration of said vitamin E-active oil in said dispersion being in a range from about 5 to about 60% by weight of said dispersion, the concentration of said acacia being in a range from about 10 to about 60% by weight of said dispersion and the concentration of water being in a range from about 30 to about 60% by weight of said dispersion; converting said dispersion into a dry, finely divided, solid product; and rinsing said product with a nonpolar solvent for said vitamin E-active oil; the improvement which comprises the step of admixing into said dispersion with gentle agitation a quantity of a surface active agent selected from the group consisting of lecithin, hydroxylated lecithin, a polyoxyethylene adduct of sorbitan monolaurate, wherein the ethylene oxide content averages about 20 mole percent, sodium lauryl sulfate and alkyl trimethylammonium chlorides derived from tallow, said quantity of said surface active agent being in a range from about 1 to about 10% by weight of said acacia.

References Cited by the Examiner
UNITED STATES PATENTS

| | | | |
|---|---|---|---|
| 2,629,662 | 2/53 | Julian et al. | 260—403 |
| 2,940,900 | 6/60 | Benton et al. | 167—81 |
| 3,031,376 | 4/62 | Levin et al. | 167—81 |
| 3,067,104 | 12/62 | Hochberg et al. | 167—81 |
| 3,070,499 | 12/62 | Mullins et al. | 167—81 |

LEWIS GOTTS, *Primary Examiner.*

FRANK CACCIAPAGLIA, JR., *Examiner.*